United States Patent
Uchida

Patent Number: 5,157,297
Date of Patent: Oct. 20, 1992

[54] STRUCTURE OF RADIAL TYPE ROTOR

[75] Inventor: Hiroyuki Uchida, Yamanashi, Japan

[73] Assignee: Fanuc, Ltd., Yamanashi, Japan

[21] Appl. No.: 651,415

[22] PCT Filed: Jun. 26, 1990

[86] PCT No.: PCT/JP90/00763

§ 371 Date: Feb. 11, 1991

§ 102(e) Date: Feb. 11, 1991

[87] PCT Pub. No.: WO91/00638

PCT Pub. Date: Jan. 10, 1991

[30] Foreign Application Priority Data

Jun. 26, 1989 [JP] Japan .................. 1-160824

[51] Int. Cl.$^5$ .............. H02K 21/12; H02K 15/12; H02K 1/22
[52] U.S. Cl. .................. 310/156; 310/45; 310/261
[58] Field of Search ............ 310/43, 44, 45, 156, 310/261, 262

[56] References Cited

U.S. PATENT DOCUMENTS

| 2,213,724 | 9/1940 | Vogel | 171/209 |
| 4,674,178 | 6/1987 | Patel | 310/156 |
| 4,746,827 | 5/1988 | Ochiai et al. | 310/156 |

FOREIGN PATENT DOCUMENTS

| 0215129 | 3/1987 | European Pat. Off. |
| 987934 | 8/1951 | France . |
| 994928 | 11/1951 | France . |
| 1150327 | 6/1955 | France . |
| 2266969 | 10/1975 | France . |
| 2439501 | 5/1980 | France . |
| 49-74410 | 6/1974 | Japan . |
| 62-233053 | 10/1987 | Japan . |
| 196443 | 3/1938 | Sweden . |

OTHER PUBLICATIONS

Copy of Search Report, 3 pages.

Primary Examiner—Steven L. Stephan
Assistant Examiner—E. To
Attorney, Agent, or Firm—Nikaido, Marmelstein Murray & Oram

[57] ABSTRACT

A structure of the radial type rotor for a synchronous motor having a shaft (12) comprising a magnetic material and having a rotor core (2) held by magnets (18), wherein due to the fact that the presence of the above-mentioned magnetic shaft (12) causes leakage of magnetic flux upon magnetization or rotation of the rotor and therefore reduction of the magnetization performance and output performance, the shaft portion (12a) opposing the inner circumferential surface of the rotor body (10) is made small in diameter to reduce the leakage magnetic flux and the resistance of the shaft (12) to bending force is reinforced by filling the gap with the rotor body (10) with a resin material (22) or provision of a node (24).

4 Claims, 2 Drawing Sheets

STRUCTURE OF RADIAL TYPE ROTOR

DESCRIPTION

1. Technical Field

The present invention relates to a structure of the radial type rotor in a synchronous type motor, which has a shaft comprised of a magnetic material and which holds the rotor core by magnets.

2. Background Art

In general, rotor shafts are high in strength and are made using inexpensive ferrous bar materials. In a rotor of a radial type where the rotor core is held by magnets, however, the existence of a ferrous shaft, which is a ferromagnetic body, results in a smaller density of magnetic flux passing through the magnet portions close to the shaft upon magnetization and thus causes incomplete magnetization. Further, after magnetization, when turning the rotor so as to obtain the torque output for the motor, the magnetic flux leaks to the shaft and therefore it sometimes is not possible to obtain a desired torque output.

To reduce the leakage of magnetic flux at the magnetization and the output rotation, the shaft material has been made of stainless steel or other nonmagnetic materials and the region of the shaft opposing the magnets has been made smaller.

Stainless steel, however, is expensive and by making the shaft smaller in diameter, the strength of the shaft is remarkably reduced.

DISCLOSURE OF THE INVENTION

Accordingly, to resolve the above problems, an object of the present invention is to provide a rotor structure which raises the magnetization of the magnets and raises the torque output without reducing the strength of the shaft, at low cost.

In consideration of the above object, there is provided a structure of the radial type rotor which has a shaft comprised of a magnetic material and has a rotor core held by magnets, said structure of the radial type rotor characterized in that the portion of the shaft opposing the rotor body is formed to be narrower than other portions and the gap between the narrow portion of the shaft and the said rotor body is filled with a resin material which is then cured.

Further, it provides a structure of the radial type rotor characterized in that a thin annular node is formed at the above-mentioned narrow portion regardless of the presence or absence of the above-mentioned resin material.

Although the shaft is comprised of iron or another high strength magnetic material, the portion opposing the rotor body is made narrow so that it is possible to reduce the leakage of magnetic flux from the magnet portion to the shaft both upon magnetization and upon rotation of the rotor. In this case, the shaft is reinforced in strength by filling and curing a resin material in the gap between the said shaft and the rotor body.

Further, instead of filling a resin material, it is possible to provide a node at the narrow portion of the shaft and have the node abut against the inner circumference of the rotor when a bending force acts on the shaft so as to enable the bending force to be withstood.

BEST MODE FOR CARRYING OUT THE INVENTION

Figure 1:
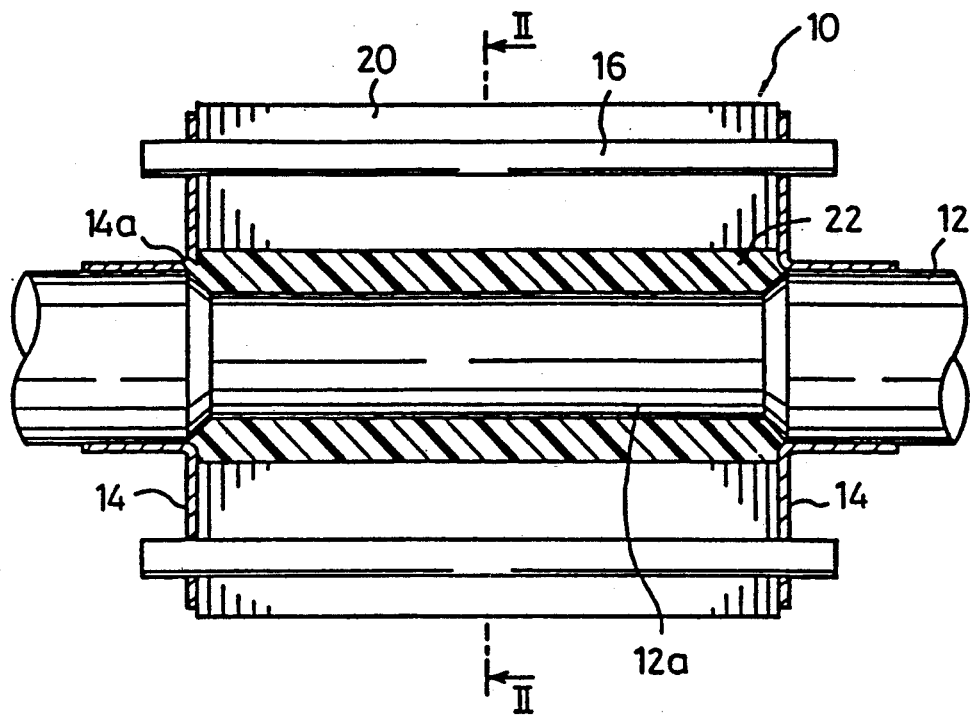
FIG. 1 is a lateral sectional view of a rotor according to the present invention.

Below, a more detailed explanation will be made of the present invention based on the embodiments shown in the attached drawings. First, referring to FIG. 1 and FIG. 2, a rotor core sector 20 comprised of laminated plates and held by a plurality of magnets 18 is held by end plates 14 at its two ends in the longitudinal direction along with the magnets, 18 extending longitudinally and radially with respect to the core, and, further, is penetrated and held by rods 16 to thus form a rotor body 10. Through this rotor body 10 is inserted a shaft 12, which is tightened to form the rotor. The portion opposing the rotor body 10 is a narrow shaft portion 12a formed to be small in diameter. The radial type of rotor shown in this figure is assembled in this way and then magnetized. At that time, to prevent the presence of the shaft 12 made of the low cost ferrous ferromagnetic material from causing leakage of magnetization magnetic flux to the magnets 18, the region opposing the rotor body 10, that is, the region opposing the magnets 18, is formed to be smaller in diameter so as to be distanced from the inner circumferential surface of the rotor 10.

If a bending force acts on the shaft, however, deflection inversely proportional to the fourth power of the diameter occurs, so there is a major problem in the strength of the shaft if it is left small in diameter. Therefore, in the present invention, for example, liquid resin, for example, epoxy resin, is poured from a hole 14a provided in the end plate 14 so as to fill the gap between the rotor body 10 and the narrow shaft portion 12a. This is cured to form a resin layer 22 and thus reinforce the shaft 12.

Figure 3:
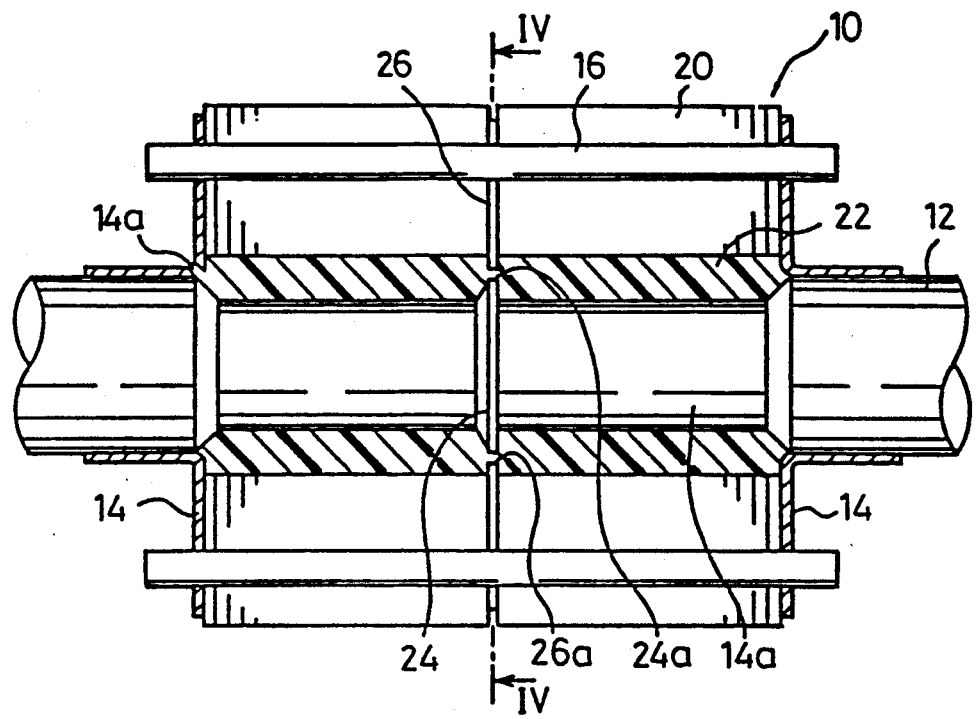
FIG. 3 is a lateral sectional view showing another embodiment of the rotor according to the present invention.
Figure 4:
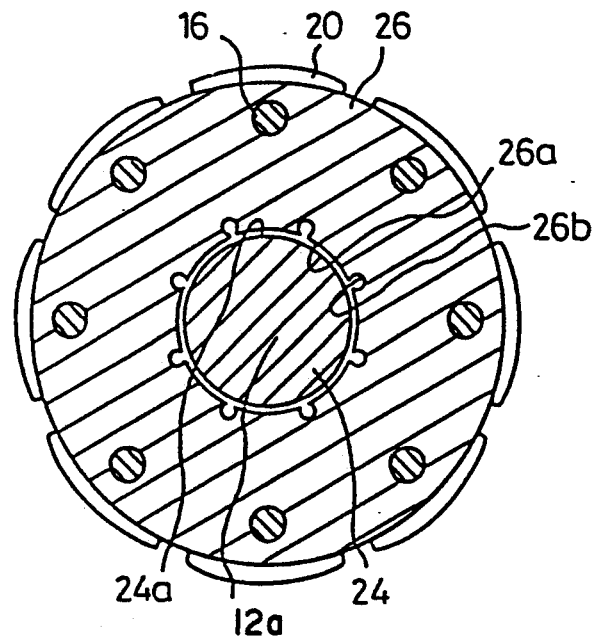
FIG. 4 is a longitudinal sectional view along the arrow line IV—IV of FIG. 3.

As a means for reinforcing the shaft 12 against bending force, for example, the method shown in FIG. 3 and FIG. 4 may be used. That is, a thin and annular node 24 is formed near the center of the narrow portion 12a. When the shaft 12 is bent, the node 24 abuts against the inner circumferential surface of the rotor body 10 and the rigidity of the rotor body 10 prevents the shaft 12 from being bent more than that amount. In this case, the dimension of the gap between the outer circumference of the node 24 and the inner circumference of the rotor 10 must be set below the amount of allowable deflection of the shaft 12, but the outer diameter dimension of the node 24 cannot always be set to the convenient dimension due to limitations of assembly of the shaft 12 into the rotor body 10 etc. Therefore, the rotor 10 has mounted to it at least one annular plate member 26 comprised of a nonmagnetic material at a position where the shaft 12 opposes the node 24, and the inner diameter dimension of the inner circumference 26a of the annular plate 26 is set, with respect to the outer diameter dimension of the outer circumference 24a of the node 24, to a dimension determined by the amount of allowable deflection of the shaft 12. The inherent object of the present invention is to reduce the amount of leakage of magnetic flux from the magnets due to the presence of the shaft 12 made of a ferromagnetic material, so the above-mentioned node 24 is desirably formed thin within the range where it can perform its reinforcing action. Further, the inner diameter dimension of the annular plate 26 formed of a nonmagnetic material is preferably made small, within the range not obstructing the work of inserting and assembling the shaft 12 into the rotor body 10, and the outer diameter dimension of the node 24 of the shaft is preferably made correspondingly small. Further, not just one set of the above-mentioned node 24 and at least one annular plate 26, but, in accordance with need, several sets maybe provided, but provision, to the extent possible, at the center of the rotor body 10 in the longitudinal direction effectively prevents deflection of the shaft 12 and acts to reinforce the shaft 12.

When the above node 24 is used, it is not always necessary to fill and cure a resin in the gap between the narrow portion 14a of the shaft 12 and the rotor body 10, but it is desirable to fill and cure resin to make the reinforcement of the shaft 12 more complete. In this case, it is desirable, for pouring liquid resin from the hole 14a of the end plate 14 and filling the resin in all of the gap, to provide holes 26b in the inner circumference 26a of the annular plate 26 to serve as channels for the liquid resin. The holes 26b are shown in FIG. 4. Channel holes may be provided in the node 24 as well. There is no inherent need for the node 24 to be a perfect annular shape. For example, notches may be provided every 60 degrees of angle. In this case, the notches act as the channel holes. Further, when forming the annular plate 26 by punching, the above-mentioned channel holes 26b may be punched out simultaneously.

Figure 2:
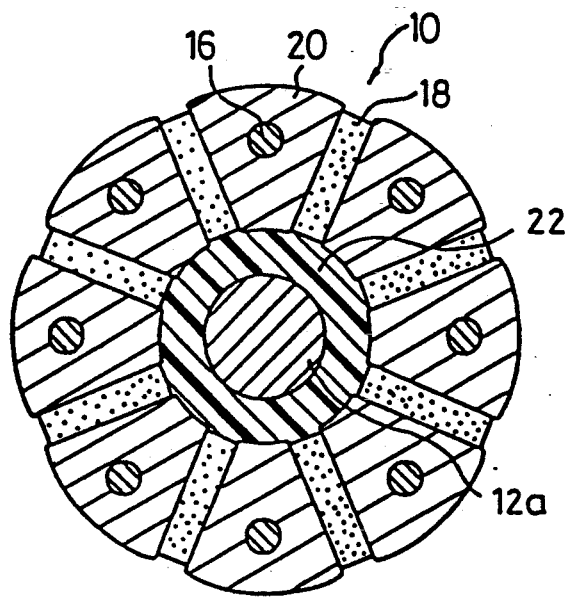
FIG. 2 is a longitudinal sectional view along the arrow line II—II of FIG. 1.

Comparing the value found by analysis of the magnetic flux density at the inner circumferential portion of the magnets near the narrow portion of the shaft upon magnetization in the rotor structure of the present invention shown in FIG. 1 with the value of analysis of a rotor structure with a shaft without a narrow portion, it was confirmed that the magnetic flux density was increased about 7 percent. In the above, the explanation was made of only the magnetization, but the same applies to leakage of magnetic flux caused by the magnets after magnetization in a motor using a rotor having the structure of the present invention after magnetization is completed. Therefore, the output torque of the rotor according to the present invention becomes larger than that of a rotor having a shaft without a narrow portion.

As clear from the above explanation, according to the present invention, it is possible to provide a rotor structure which is inexpensive and free of almost any reduction in strength and which improves both the magnetization performance and output performance.

I claim:

1. A structure for a radial type rotor for a synchronous motor, comprising:
   a rotor body formed of a plurality of rotor core sectors and a plurality of magnets arranged alternately in a circumferential direction;
   a rotor shaft of magnetic material extending centrally through said rotor body, a portion of said rotor haft opposing said rotor body being formed to be narrower than other portions of said shaft so as to form a gap between said narrow shaft portion and said rotor body to reduce magnetic leakage to the shaft, said gap being filled with a liquid resin material cured to become solid so as to adhere said rotor body to said shaft and mechanically reinforce said shaft;
   said rotor shaft being formed, within said rotor body, with at least one annular node extending radially into said gap; and
   said rotor body being provided with at least one annular plate of non-magnetic material at a position corresponding to said at least one annular node, said at least one annular plate having an inner dimension slightly larger than an outer dimension of said annular node so that a preset annular clearance dimension is formed therebetween, deflection of said shaft at said position thereby being limited to the dimension of said clearance.

2. A structure of a radial type rotor according to claim 1, wherein annular end plates having axially extending portions are positioned at each end of said rotor body to hold said rotor body and mechanically connect said body with said shaft, at least one hole being provided in at least one end plate for injection of said liquid resin material into said gap.

3. A structure of radial type rotor according to claim 1, wherein said annular plate is provided with openings for passage of said liquid resin material.

4. A structure of a radial type rotor according to claim 1, wherein said annular node is formed at a central position of said narrow portion.

* * * * *

UNITED STATES PATENT AND TRADEMARK OFFICE
CERTIFICATE OF CORRECTION

PATENT NO. :   5,157,297
DATED      :   October 20, 1992
INVENTOR(S):   Hiroyuki UCHIDA It is certified that error appears in the above-identified patent and that said Letters Patent is hereby corrected as shown below:

On the cover page, Item [30], delete "Jun. 26, 1990" and substitute therefor -- Jun. 12, 1990 --.

Signed and Sealed this

Twenty-sixth Day of April, 1994

Attest:

BRUCE LEHMAN

*Attesting Officer*   *Commissioner of Patents and Trademarks*